US011908395B2

(12) United States Patent
Lin et al.

(10) Patent No.: US 11,908,395 B2
(45) Date of Patent: Feb. 20, 2024

(54) ELECTRONIC DEVICE

(71) Applicant: InnoLux Corporation, Miao-Li County (TW)

(72) Inventors: Chun-Hsien Lin, Miao-Li County (TW); Jui-Feng Ko, Miao-Li County (TW); Geng-Fu Chang, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/107,492

(22) Filed: Feb. 8, 2023

(65) Prior Publication Data

US 2023/0282158 A1 Sep. 7, 2023

(30) Foreign Application Priority Data

Mar. 7, 2022 (CN) ......................... 202210216188.8

(51) Int. Cl.
*G09G 3/3266* (2016.01)
*G09G 3/32* (2016.01)
*G09G 3/00* (2006.01)

(52) U.S. Cl.
CPC ............... *G09G 3/32* (2013.01); *G09G 3/006* (2013.01); *G09G 2300/0861* (2013.01); *G09G 2310/0202* (2013.01); *G09G 2310/0267* (2013.01); *G09G 2310/0281* (2013.01); *G09G 2310/0286* (2013.01); *G09G 2320/0223* (2013.01); *G09G 2330/02* (2013.01); *G09G 2330/12* (2013.01)

(58) Field of Classification Search
CPC ................. G09G 3/32; G09G 2330/02; G09G 2310/0267; G09G 2310/0286; G09G 2320/0223; G09G 2310/0281
See application file for complete search history.

(56) References Cited

U.S. PATENT DOCUMENTS

2016/0190228 A1 6/2016 Park
2021/0365156 A1* 11/2021 Choi ..................... G06F 3/0446
2022/0208108 A1* 6/2022 Lee ....................... G09G 3/3225
2023/0046059 A1* 2/2023 Park ..................... G09G 3/3291
2023/0180589 A1* 6/2023 Wang ..................... H10K 59/90
345/212

(Continued)

FOREIGN PATENT DOCUMENTS

CN 105742312 A 7/2016
CN 109188801 A 1/2019

*Primary Examiner* — Dennis P Joseph
(74) *Attorney, Agent, or Firm* — Winston Hsu

(57) ABSTRACT

An electronic device including a panel, a Chip on Film and a flexible circuit board is disclosed. The panel includes a first gate driver, a switch transistor and a driving transistor. An output terminal of the switch transistor is coupled to a control terminal of the driving transistor. The first gate driver is used for receiving an AC signal and a DC signal and outputting a control signal to a control terminal of the switch transistor. The Chip on Film is electrically connected to the panel and used for transmitting a data signal to an input terminal of the switch transistor and transmitting the AC signal to the first gate driver. The flexible circuit board is electrically connected to the panel and used for transmitting a power signal to an input terminal of the driving transistor and transmitting the DC signal to the first gate driver.

20 Claims, 7 Drawing Sheets

(56) References Cited

U.S. PATENT DOCUMENTS

| | | | | |
|---|---|---|---|---|
| 2023/0196976 | A1* | 6/2023 | Park | G09G 3/2096<br>345/214 |
| 2023/0264468 | A1* | 8/2023 | Kumamoto | B41J 2/14233<br>347/5 |

* cited by examiner

ELECTRONIC DEVICE

BACKGROUND OF THE DISCLOSURE

1. Field of the Disclosure

The present disclosure relates to an electronic device, and more particularly to an electronic device for transmitting signals through a Chip on Film (COF) or a flexible circuit board.

2. Description of the Prior Art

An electronic device can generate various signals to a panel disposed at a side of the electronic device. When the electronic device has a large size or high resolution, the signal quality may be affected because of the problem of resistance-capacitance (RC) delay.

SUMMARY OF THE DISCLOSURE

An embodiment of the present disclosure provides an electronic device. The electronic device includes a panel, a Chip on Film and a flexible circuit board. The panel includes a first gate driver, a switch transistor and a driving transistor. An output terminal of the switch transistor is coupled to a control terminal of the driving transistor. The first gate driver is used for receiving an alternating current (AC) signal and a direct current (DC) signal and outputting a control signal to a control terminal of the switch transistor according to the AC signal and the DC signal. The Chip on Film is electrically connected to the panel, and the Chip on Film is used for transmitting a data signal to an input terminal of the switch transistor and transmitting the AC signal to the first gate driver. The flexible circuit board is electrically connected to the panel, and the flexible circuit board is used for transmitting a power signal to an input terminal of the driving transistor and transmitting the DC signal to the first gate driver.

These and other objectives of the present disclosure will no doubt become obvious to those of ordinary skill in the art after reading the following detailed description of the embodiment that is illustrated in the various figures and drawings.

DETAILED DESCRIPTION

Figure 1:
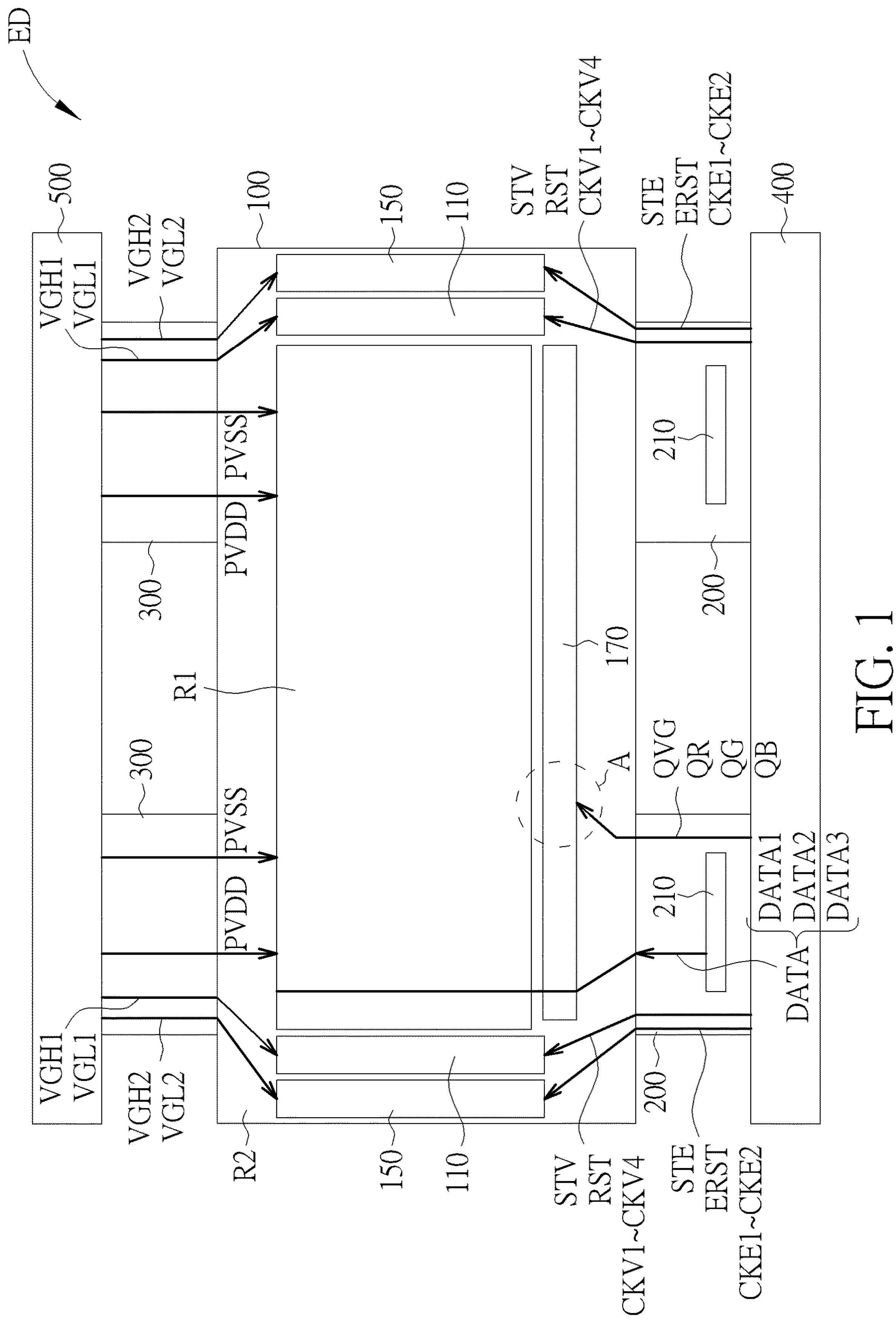
FIG. 1 is an architecture schematic diagram of an electronic device according to a first embodiment of the present disclosure.

The present disclosure may be understood by reference to the following detailed description, taken in conjunction with the drawings as described below. It is noted that, for purposes of illustrative clarity and being easily understood by the reader, various drawings of this disclosure show a portion of the device, and certain components in various drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms “include”, “comprise” and “have” are used in an open-ended fashion, and thus should be interpreted to mean “include, but not limited to . . . ”. When the terms “include”, “comprise” and/or “have” are used in the description of the present disclosure, the corresponding features, areas, steps, operations and/or components would be pointed to existence, but not limited to the existence or addition of one or a plurality of the corresponding or other features, areas, steps, operations, components and/or combinations thereof.

When an element or layer is referred to as being “on” or “connected to” another element or layer, it may be directly on or directly connected to the other element or layer, or intervening elements or layers may be presented (indirect condition). In contrast, when an element is referred to as being “directly on” or “directly connected to” another element or layer, there are no intervening elements or layers presented.

The directional terms mentioned in this document, such as “up”, “down”, “front”, “back”, “left”, “right”, etc., are only directions referring to the drawings. Therefore, the directional terms used are for illustration, not for limitation of the present disclosure.

The terms “about”, “equal”, “identical” or “the same”, and “substantially” or “approximately” mentioned in this document generally mean being within 20% of a given value or range, or being within 10%, 5%, 3%, 2%, 1% or 0.5% of a given value or range.

The ordinal numbers used in the description and claims, such as “first”, “second”, “third”, etc., are used to describe elements, but they do not mean/represent that the element(s) have any previous ordinal numbers, nor do they represent the order of one element and another element, or the order of manufacturing methods. The ordinal numbers used are only to clearly discriminate an element with a certain name from another element with the same name. The claims and the description may not use the same terms. Accordingly, in the following description, a first constituent element may be a second constituent element in a claim.

The electronic device of the present disclosure may include a display device, a backlight device, an antenna device, a sensing device or a tiled device, but not limited herein. The electronic device may include a bendable or flexible electronic device. The display device may include a non-self-emissive display device or a self-emissive display device. The antenna device may include a liquid-crystal type antenna device or an antenna device other than liquid-crystal type, and the sensing device may include a sensing device used for sensing capacitance, light, heat or ultrasonic waves, but not limited herein. The electronic device may include electronic elements such as passive elements and active elements, for example, capacitors, resistors, inductors, diodes, transistors, etc. The diode may include a light-emitting diode or a photodiode. For example, the light-emitting diode may include an organic light-emitting diode (OLED), a mini light-emitting diode (mini LED), a micro light-emitting diode (micro LED) or a quantum dot light-emitting diode (quantum dot LED), but not limited herein. The tiled device may be, for example, a display tiled device or an antenna tiled device, but not limited herein. It should be noted that the electronic device may be any arrangement and combination of the above, but not limited herein.

It should be noted that the technical features in different embodiments described in the following can be replaced, recombined, or mixed with one another to constitute another embodiment without departing from the spirit of the present disclosure.

Figure 2:
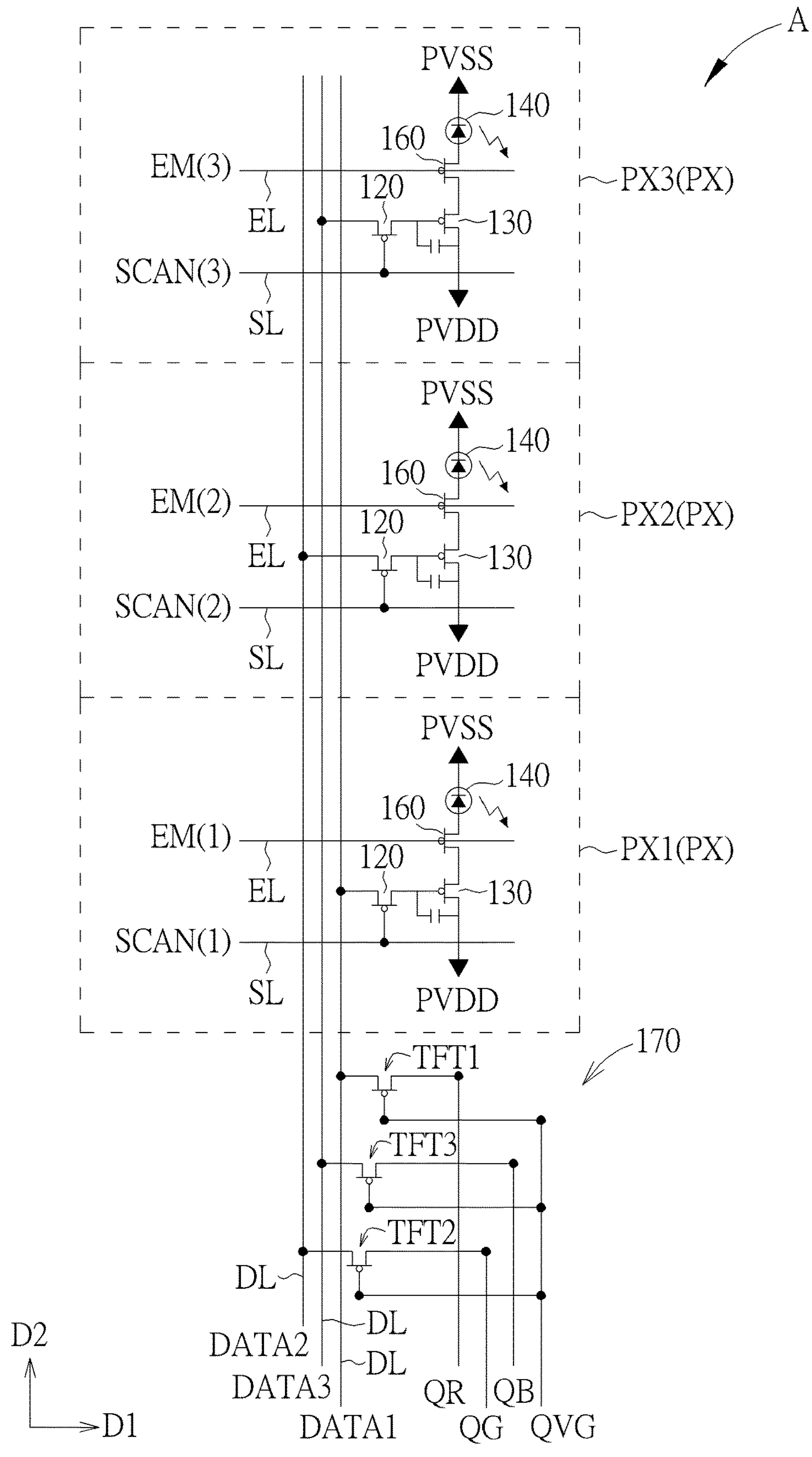
FIG. 2 is a partially enlarged circuit architecture schematic diagram of a region A shown in FIG. 1.
Figure 3:
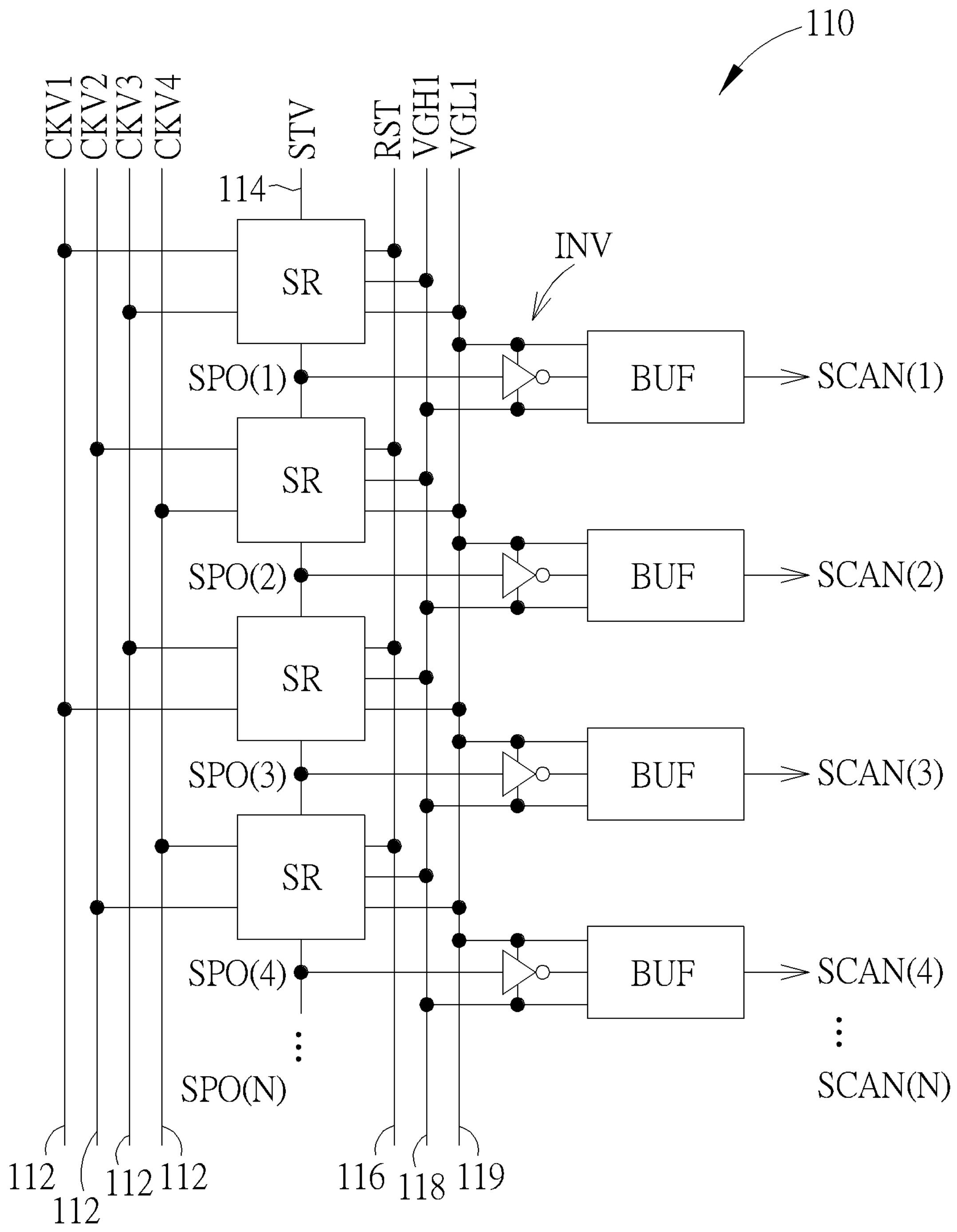
FIG. 3 is a partial circuit architecture schematic diagram of a first gate driver of an electronic device according to an embodiment of the present disclosure.

Refer to FIG. 1, FIG. 2 and FIG. 3. FIG. 1 is an architecture schematic diagram of an electronic device according to a first embodiment of the present disclosure. FIG. 2 is a partially enlarged circuit architecture schematic diagram of a region A shown in FIG. 1. FIG. 3 is a partial circuit architecture schematic diagram of a first gate driver of an electronic device according to an embodiment of the present disclosure. As shown in FIG. 1, FIG. 2 and FIG. 3, an electronic device ED according to an embodiment of the present disclosure includes a panel 100, a Chip on Film (COF) 200 and a flexible circuit board 300. The panel 100 may include, for example, a light-emitting diode panel (LED panel) or an organic light-emitting diode panel (OLED panel), but not limited to the above. The substrate (not shown) of the panel 100 may include hard material and/or flexible material, such as glass, quartz, sapphire, polyimide (PI), polyethylene terephthalate (PET), other suitable materials or combinations of the above, but not limited herein. The COF 200 is electrically connected to the panel 100, and the flexible circuit board 300 is electrically connected to the panel 100. In some embodiments, the COF 200 and the flexible circuit board 300 may be respectively disposed on opposite two sides of the panel 100. For example, the COF 200 may be disposed on the lower side of the panel 100, the flexible circuit board 300 may be disposed on the upper side of the panel 100, and the COF 200 and the flexible circuit board 300 are respectively connected to the panel 100, but not limited herein.

The panel 100 has a working region R1 and a peripheral region R2, and the peripheral region R2 is adjacent to the working region R1. For example, the peripheral region R2 may be located around the working region R1 or located on at least one side of the working region R1, but not limited herein. The working region R1 may be different according to the application of the electronic device, such as including a display region, a sensing region, a touch region, a light-emitting region, other applications or combinations of the above. The panel 100 may include a first gate driver 110, a switch transistor 120 and a driving transistor 130, but not limited herein. The first gate driver 110 may be disposed in the peripheral region R2 and electrically connected to the COF 200 and the flexible circuit board 300. The first gate driver 110 may be disposed in the peripheral region R2 located on one side (e.g. the left side or the right side) of the working region R1, but not limited herein. In some embodiments, the panel 100 may include two first gate drivers 110, which are respectively disposed in the peripheral region R2 located on opposite two sides (e.g. the left side and the right side) of the working region R1, and each of the first gate drivers 110 may be electrically connected to different COFs 200 and flexible circuit boards 300, but not limited herein. The switch transistor 120 and the driving transistor 130 may be disposed in the working region R1. Specifically, the panel 100 may include a plurality of pixels PX. The plurality of pixels PX may be disposed in the working region R1 in an array arrangement with columns and rows, for example, but not limited herein. The pixel PX may, for example, include a plurality of sub-pixels (e.g. a sub-pixel PX1, a sub-pixel PX2 and/or a sub-pixel PX3). In some embodiments, the sub-pixel PX1, the sub-pixel PX2 and/or the sub-pixel PX3 may respectively be a red sub-pixel, a green sub-pixel and/or a blue sub-pixel, but not limited herein; other sub-pixels of different colors may be provided according to other requirements. A plurality of sub-pixels in each of the pixels PX may respectively include a switch transistor 120 and a driving transistor 130. The switch transistor 120 and the driving transistor 130 respectively have a control terminal, an input terminal and an output terminal. The control terminal of the switch transistor 120 or the driving transistor 130 may be a gate, the input terminal thereof may be one of a source and a drain, and the output terminal thereof may be the other of the source and the drain, but not limited herein. The output terminal of the switch transistor 120 is coupled to the control terminal of the driving transistor 130. In some embodiments, the switch transistor 120 and/or the driving transistor 130 may be, for example, a thin film transistor (TFT), but not limited herein.

The first gate driver 110 is used for receiving an alternating current (AC) signal (e.g. a clock signal (such as a clock signal CKV1, a clock signal CKV2, a clock signal CKV3 or a clock signal CKV4), a start signal STV and/or a reset signal RST) and a direct current (DC) signal (e.g. a gate high voltage VGH1 and/or a gate low voltage VGL1), and outputting a control signal (e.g. a scan signal) to the control terminal of the switch transistor 120 according to the AC signal and the DC signal. Specifically, taking the first gate driver 110 shown in FIG. 3 as an example, the first gate driver 110 may include a plurality of clock signal lines 112, a start signal line 114, a reset signal line 116, a high voltage signal line 118, a low voltage signal line 119 and/or a plurality of shift registers SR. The first gate driver 110 may be, for example, a scan driver, which is used for providing scan signals. The plurality of clock signal lines 112 may, for example, transmit the received clock signal CKV1, clock signal CKV2, clock signal CKV3 and clock signal CKV4 to the plurality of shift registers SR respectively. For example, two of the plurality of clock signal lines 112 may transmit two of the received clock signal CKV1, clock signal CKV2, clock signal CKV3 and clock signal CKV4 to one of the plurality of shift registers SR respectively, but not limited herein. One of the plurality of shift registers SR may receive the start signal STV through the start signal line 114, the reset signal line 116 transmits the received reset signal RST to the plurality of shift registers SR, the high voltage signal line 118 transmits the received gate high voltage VGH1 to the plurality of shift registers SR, and the low voltage signal line 119 transmits the received gate low voltage VGL1 to the plurality of shift registers SR, but not limited herein. It should be noted that, as an example, in the present disclosure, the clock signal CKV1, the clock signal CKV2, the clock signal CKV3, the clock signal CKV4, the start signal STV and/or the reset signal RST that are referred to may be the AC signal(s), and the gate high voltage VGH1 and/or the gate low voltage VGL1 that are referred to may be the DC signal(s).

The plurality of shift registers SR may respectively generate an output signal SPO(1), an output signal SPO(2), an output signal SPO(3), . . . to an output signal SPO(N) according to the clock signals (e.g. the clock signal CKV1, the clock signal CKV2, the clock signal CKV3 and/or the clock signal CKV4), the start signal STV, the reset signal RST, the gate high voltage VGH1 and the gate low voltage VGL1 described above, and may respectively output a scan signal SCAN(1), a scan signal SCAN(2), a scan signal SCAN(3), . . . to a scan signal SCAN(N) to the control terminal of the connected switch transistor 120, for example (but not limited to), through an inverter INV and/or a buffer BUF. For example, the panel 100 of the electronic device ED may include a plurality of scan lines SL, and the first gate driver 110 may transmit the outputted scan signal SCAN(1), scan signal SCAN(2), scan signal SCAN(3), . . . to scan signal SCAN(N) to the control terminal of the switch transistor 120 of the sub-pixel (e.g. the sub-pixel PX1, the sub-pixel PX2 and/or the sub-pixel PX3) of each of the pixels PX through the corresponding scan line SL respectively, as shown in FIG. 2, wherein "N" may be a positive integer. For example, N may be 1080, and the number of shift registers SR may be 1080 correspondingly, but not limited herein. In addition, the output signal SPO(1), the output signal SPO(2), the output signal SPO(3), . . . to the output signal SPO(N−1) generated by the shift registers SR may be, for example, used as the start pulse output of the shift register SR of the next stage respectively, but not limited herein. In some embodiments, each of the shift registers SR may further include a buffer (not shown). The above buffer BUF and/or the buffer in the shift register SR may be used to enhance and push the signals, but not limited herein. The first gate driver 110 shown in FIG. 3 is merely one of the examples, which is not limited herein.

In some embodiments, the COF 200 may be used for transmitting a data signal DATA to the input terminal of the switch transistor 120 and transmitting the AC signal (e.g. the clock signal, the start signal and/or the reset signal) to the first gate driver 110, but not limited herein. Specifically, the panel 100 of the electronic device ED may include a plurality of data lines DL. As shown in FIG. 2, the scan lines SL may extend along a first direction D1, and the data lines DL may extend along a second direction D2. For example, the first direction D1 and the second direction D2 may be substantially perpendicular to each other, but limited herein. The COF 200 may, for example, transmit the data signal DATA to the input terminal of the switch transistor 120 in the sub-pixel of each of the pixels PX through the corresponding data line DL respectively. As shown in FIG. 1, in some embodiments, the COF 200 may transmit the clock signal CKV1, the clock signal CKV2, the clock signal CKV3, the clock signal CKV4, the start signal STV and/or the reset signal RST to the first gate driver 110 through the wiring, but not limited herein. In some embodiments, the data signal DATA may include a data signal DATA1, a data signal DATA2 and/or a data signal DATA3. The COF 200 may, for example, transmit the data signal DATA1 to the red sub-pixel PX1 through the corresponding data line DL, transmit the data signal DATA2 to the green sub-pixel PX2 through the corresponding data line DL, and/or transmit the data signal DATA3 to the blue sub-pixel PX3 through the corresponding data line DL, but not limited herein. In some embodiments, as shown in FIG. 1, the COF 200 may further include a driving chip 210, and the driving chip 210 may be used for providing the data signal DATA, but not limited herein. In some embodiments, as shown in FIG. 1, the electronic device ED may further include a first circuit board 400. The first circuit board 400 may be electrically connected to the COF 200, and the first circuit board 400 may be used for providing some AC signals (such as the clock signal CKV1, the clock signal CKV2, the clock signal CKV3, the clock signal CKV4, the start signal STV and/or the reset signal RST) and transmitting these AC signals to the first gate driver 110 through the COF 200, but not limited herein.

In some embodiments, the flexible circuit board 300 may be used for transmitting a power signal (e.g. the signal of a high voltage source PVDD and/or a low voltage source PVSS) to the input terminal of the driving transistor 130 and/or transmitting the DC signal (e.g. the gate high-voltage VGH1 and the gate low voltage VGL1) to the first gate driver 110, but not limited herein. Specifically, the flexible circuit board 300 may transmit the high voltage source PVDD and the low voltage source PVSS to the sub-pixels of each of the pixels PX. For example, the high voltage source PVDD may be transmitted to the input terminal of the driving transistor 130 of the sub-pixel (e.g. the sub-pixel PX1, the sub-pixel PX2 or the sub-pixel PX3) of the pixel PX through the wiring (not shown), and the low voltage source PVSS may be provided to the output terminal of the driving transistor 130 of the sub-pixel (e.g. the sub-pixel PX1, the sub-pixel PX2 or the sub-pixel PX3) of the pixel PX through the wiring (not shown). In some embodiments, the flexible circuit board 300 may transmit the gate high voltage VGH1 and the gate low voltage VGL1 to the first gate driver 110 through traces (not shown) respectively, but not limited herein. In some embodiments, as shown in FIG. 1, the electronic device ED may further include a second circuit board 500. The second circuit board 500 may be electrically connected to the flexible circuit board 300, and the second circuit board 500 may be used for providing the power signal (such as the high voltage source PVDD or the low voltage source PVSS) and transmitting the power signal to the input terminal of the driving transistor 130 through the flexible circuit board 300. In some embodiments, the second circuit board 500 may be used for providing the DC signal (such as the gate high voltage VGH1 and/or the gate low voltage VGL1) and transmitting the DC signal (such as the gate high voltage VGH1 and/or the gate low voltage VGL1) to the first gate driver 110 through the flexible circuit board 300, but not limited herein.

In the present disclosure, as an example, the power signal or the DC signal that is referred to may be a large current signal, and the AC signal and the data signal that are referred to may be small current signals, but not limited herein. According to the above architecture design of the electronic device ED, the power signal and/or the DC signal with a larger current may be transmitted through the flexible circuit board 300 disposed at, for example, the upper side of the panel 100, and the AC signal and/or the data signal with a small current may be transmitted through the COF 200 disposed at, for example, the lower side of the panel 100, thereby increasing the flexibility of signal transmission and benefitting the design flexibility of signal transmission, but not limited herein.

Figure 4:
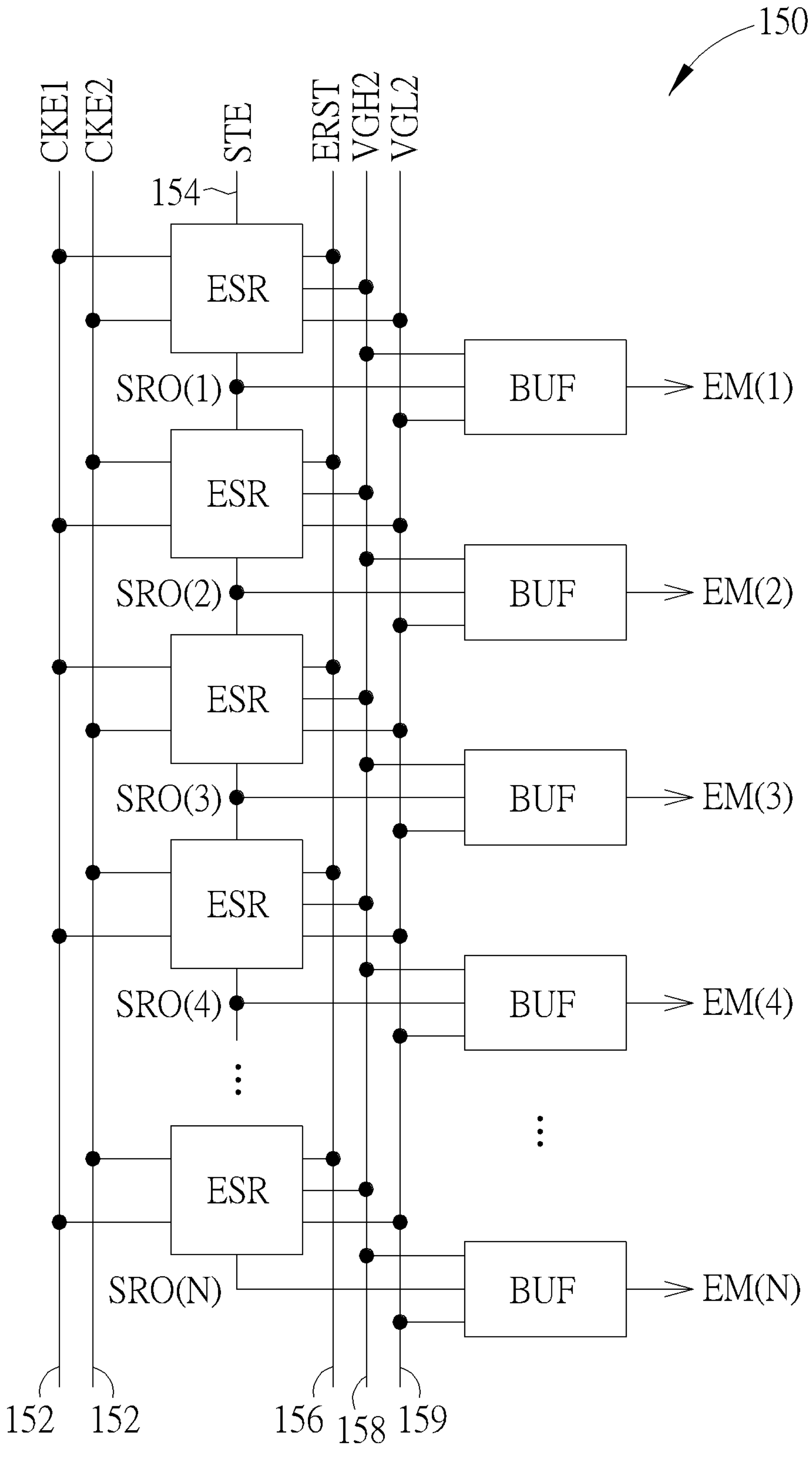
FIG. 4 is a partial circuit architecture schematic diagram of a second gate driver of an electronic device according to an embodiment of the present disclosure.

Refer to FIG. 1, FIG. 2 and FIG. 4. FIG. 4 is a partial circuit architecture schematic diagram of a second gate driver of an electronic device according to an embodiment of the present disclosure. As shown in FIG. 1, FIG. 2 and FIG. 4, in some embodiments, the sub-pixel (e.g. the sub-pixel PX1, the sub-pixel PX2 or the sub-pixel PX3) of each of the pixels PX of the panel 100 of the electronic device ED may include a light-emitting element 140 (shown in FIG. 2), and the output terminal of the driving transistor 130 may be coupled to the light-emitting element 140, so that the light-emitting element 140 may receive the power signal transmitted from the flexible circuit board 300. For example, the high voltage source PVDD transmitted from the flexible circuit board 300 to the driving transistor 130 may be transmitted to an end of the light-emitting element 140, and the low voltage source PVSS transmitted from the flexible circuit board 300 may be transmitted to another end of the light-emitting element 140, but not limited herein. The panel 100 of the electronic device ED may further include a second gate driver 150 and/or a light-emitting transistor 160. In some embodiments, the second gate driver 150 may be disposed in the peripheral region R2 and electrically connected to the COF 200 and/or the flexible circuit board 300. For example, the second gate driver 150 may be disposed in the peripheral region R2 located at a side (e.g. the left side or the right side) of the working region R1 and may be disposed at a side of the first gate driver 110. For example, the first gate driver 110 may be located between the second gate driver 150 and the working region R1, but not limited herein. In some embodiments (not shown), the second gate driver 150 may be located between the first gate driver 110 and the working region R1, for example. In some embodiments, the panel 100 may include a plurality of second gate drivers 150, such as two second gate drivers 150, which are respectively disposed in the peripheral region R2 located at two sides (e.g. the left side and the right side) of the working region R1, and the two second gate drivers 150 may be respectively electrically connected to different COFs 200 and/or flexible circuit boards 300, but not limited herein. In some embodiments, the light-emitting transistor 160 may be disposed in the working region R1. Specifically, the sub-pixel (e.g. the sub-pixel PX1, the sub-pixel PX2 or the sub-pixel PX3) of each of the pixels PX may include the light-emitting transistor 160, wherein the light-emitting transistor 160 has a control terminal, an input terminal and an output terminal. In some embodiments, the control terminal of the light-emitting transistor 160 may be a gate, the input terminal thereof may be one of a source and a drain, and the output terminal thereof may be the other of the source and the drain, but not limited herein. In some embodiments, the output terminal of the driving transistor 130 may be coupled to the input terminal of the light-emitting transistor 160, and the output terminal of the light-emitting transistor 160 may be coupled to the light-emitting element 140, but not limited herein. In some embodiments, the light-emitting transistor 160 may be, for example, a thin film transistor (TFT), but not limited herein.

As shown in FIG. 1 and FIG. 4, in some embodiments, the second gate driver 150 may be used for receiving another AC signal (e.g. a clock signal (such as a clock signal CKE1 or a clock signal CKE2), a start signal STE and/or a reset signal ERST) and another DC signal (e.g. a gate high voltage VGH2 and/or a gate low voltage VGL2) and outputting another control signal (e.g. a light-emitting signal) to the control terminal of the light-emitting transistor 160 according to the another AC signal and the another DC signal, but not limited herein. Specifically, taking the second gate driver 150 shown in FIG. 4 as an example, the second gate driver 150 may include a plurality of clock signal lines 152, a start signal line 154, a reset signal line 156, a high voltage signal line 158, a low voltage signal line 159 and/or a plurality of shift registers ESR. The second gate driver 150 may be, for example, an emission driver, which is used for driving the light-emitting element 140 to operate. In some embodiments, the plurality of clock signal lines 152 may transmit the received clock signal CKE1 and clock signal CKE2 to the plurality of shift registers ESR respectively. In some embodiments, one of the plurality of shift registers ESR may receive the start signal STE through the start signal line 154, the reset signal line 156 may transmit the received reset signal ERST to the plurality of shift registers ESR, the high voltage signal line 158 may transmit the received gate high voltage VGH2 to the plurality of shift registers ESR, and the low voltage signal line 159 may transmit the received gate low voltage VGL2 to the plurality of shift registers ESR. In the present disclosure, as an example, the clock signal CKE1, the clock signal CKE2, the start signal STE and/or the reset signal ERST that are referred to may be the AC signal(s), and the gate high voltage VGH2 and/or the gate low voltage VGL2 that are referred to may be the DC signal(s).

In some embodiments, the plurality of shift registers ESR may generate an output signal SRO(1), an output signal SRO(2), an output signal SRO(3), . . . to an output signal SRO(N) according to the clock signal CKE1, the clock signal CKE2, the start signal STE, the reset signal ERST, the gate high voltage VGH2 and/or the gate low voltage VGL2 described above, and may respectively output a light-emitting signal EM(1), a light-emitting signal EM(2), a light-emitting signal EM(3), . . . to a light-emitting signal EM(N) to the control terminal of the connected light-emitting transistor 160, for example (but not limited to), through a buffer BUF, so that the light-emitting element 140 may be turned on or turned off through the light-emitting transistor 160, but not limited herein. For example, the electronic device ED may include a plurality of light-emitting signal lines EL, and the second gate driver 150 may transmit the outputted light-emitting signal EM(1), light-emitting signal EM(2), light-emitting signal EM(3), . . . to light-emitting signal EM(N) to the control terminal of the light-emitting transistor 160 of the sub-pixel (e.g. the sub-pixel PX1, the sub-pixel PX2 or the sub-pixel PX3) of each of the pixels PX through the corresponding light-emitting signal line EL respectively, as shown in FIG. 2, wherein "N" may be a positive integer. For example, N may be 1080, and the number of the shift registers ESR may be 1080 correspondingly, but not limited herein. In some embodiments, the output signal SRO(1), the output signal SRO(2), the output signal SRO(3), . . . to the output signal SRO(N−1) generated by the shift registers ESR may be, for example, used as the start pulse output of the shift register ESR of the next stage respectively, but not limited herein.

In some embodiments, the COF 200 may, for example, transmit the AC signal such as the clock signal CKE1, the clock signal CKE2, the start signal STE and/or the reset signal ERST to the second gate driver 150 through the corresponding wiring (not shown), but not limited herein. In some embodiments, the flexible circuit board 300 may transmit the DC signal such as the gate high voltage VGH2 and/or the gate low voltage VGL2 to the second gate driver 150 through the corresponding wiring (not shown), but not limited herein. In some embodiments, as shown in FIG. 1, the first circuit board 400 of the electronic device ED may be used for providing the AC signals (such as the clock signal CKE1, the clock signal CKE2, the start signal STE and the reset signal ERST) and transmitting these AC signals to the second gate driver 150 through the COF 200, but not limited herein. In some embodiments, the second circuit board 500 of the electronic device ED may be used for providing the DC signals (such as the gate high voltage VGH2 and the gate low voltage VGL2) and transmitting these DC signals to the second gate driver 150 through the flexible circuit board 300, but not limited herein.

As shown in FIG. 1 and FIG. 2, in some embodiments, the panel 100 of the electronic device ED may further include a test circuit 170. The test circuit 170 may be, for example, coupled to the light-emitting element 140 of the sub-pixel (e.g. the sub-pixel PX1, the sub-pixel PX2 or the sub-pixel PX3) of each of the pixels PX, which is used for testing the sub-pixel (e.g. the sub-pixel PX1, the sub-pixel PX2 or the sub-pixel PX3) of each of the pixels PX. Specifically, the test circuit 170 may include a plurality of switch elements, such as a switch element TFT1, a switch element TFT2 and/or a switch element TFT3, which are respectively electrically connected to the sub-pixels (such as the sub-pixel PX1, the sub-pixel PX2 and/or the sub-pixel PX3) corresponding to the pixels PX in each column. The switch element TFT1, the switch element TFT2 and/or the switch element TFT3 may be, for example, thin film transistors, but not limited herein. In some embodiments, the test circuit 170 may, for example, receive a switch control signal QVG, a turn-on signal QR, a turn-on signal QG and/or a turn-on signal QB transmitted from the COF 200. The switch control signal QVG may be transmitted to the control terminals of the switch element TFT1, the switch element TFT2 and/or the switch element TFT3, so as to control the switch element TFT1, the switch element TFT2 and/or the switch element TFT3 to be turned on or turned off. For example, the turn-on signal QR may be transmitted to the input terminal of the switch element TFT1, the turn-on signal QG may be transmitted to the input terminal of the switch element TFT2, and the turn-on signal QB may be transmitted to the input terminal of the switch element TFT3, but not limited herein. When the switch element TFT1 is turned on, the turn-on signal QR may be transmitted to the red sub-pixels (e.g. the sub-pixel PX1) through the corresponding or connected data line DL, so as to control the light-emitting elements 140 in the red sub-pixels (e.g. the sub-pixel PX1) in the corresponding column to be turned on. When the switch element TFT2 is turned on, the turn-on signal QG may be transmitted to the green sub-pixels (e.g. the sub-pixel PX2) through the corresponding or connected data line DL, so as to control the light-emitting elements 140 in the green sub-pixels (e.g. the sub-pixel PX2) in the corresponding column to be turned on. When the switch element TFT3 is turned on, the turn-on signal QB may be transmitted to the blue sub-pixels (e.g. the sub-pixel PX3) through the corresponding or connected data line DL, so as to control the light-emitting elements 140 in the blue sub-pixels (e.g. the sub-pixel PX3) in the corresponding column to be turned on. Through the above design, the test circuit 170 may be used for testing the sub-pixels in the panel 100, and the test circuit 170 may be optionally turned off or removed after the test is completed, but not limited herein.

Figure 5:
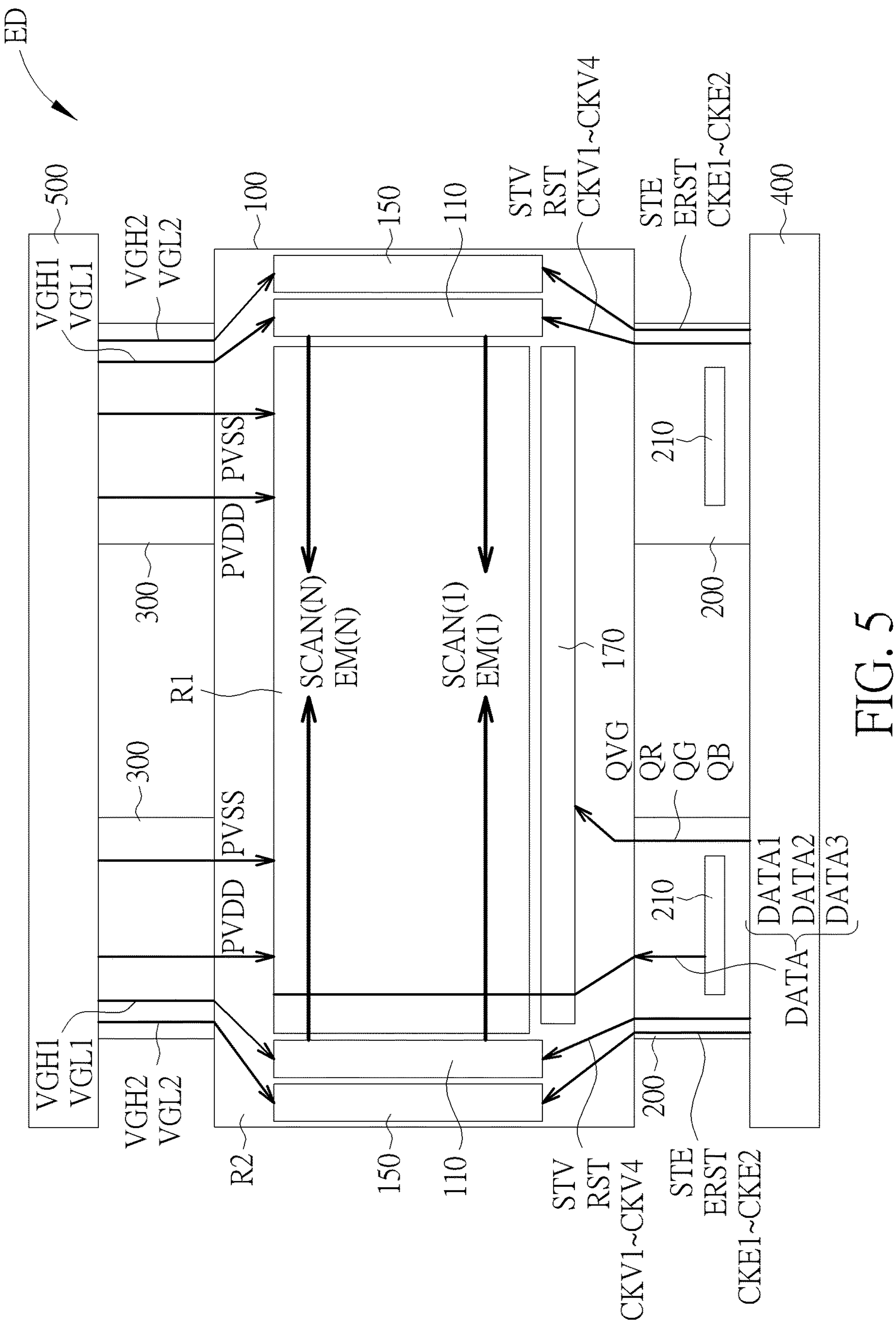
FIG. 5 is an architecture schematic diagram of an electronic device according to a second embodiment of the present disclosure.

Refer to FIG. 5, in conjunction with FIG. 3 and FIG. 4. FIG. 5 is an architecture schematic diagram of an electronic device according to a second embodiment of the present disclosure. In some embodiments, as shown in FIG. 5, FIG. 3, and FIG. 4, the COF 200 may be used for transmitting the start signal STV (the AC signal) to the first gate driver 110, one of the plurality of shift registers SR in the first gate driver 110 receives the start signal STV through the start signal line 114, and this shift register SR may be closer to the COF 200 than the other shift registers of the plurality of shift registers SR. Therefore, the scan signal SCAN(1) correspondingly outputted by the shift register SR of the first stage which receives the start signal STV and the corresponding scan line SL thereof may be closest to the COF 200, and the scan signal SCAN(N) correspondingly outputted by the shift register SR of the last stage and the corresponding scan line SL thereof may be farthest away from the COF 200, but not limited herein. Alternatively, the scan signal SCAN(N) correspondingly outputted by the shift register SR of the last stage and the corresponding scan line SL thereof may be, for example, closest to the flexible circuit board 300, but not limited herein. In some embodiments, the COF 200 may be used for transmitting the start signal STE to the second gate driver 150, one of the plurality of shift registers ESR in the second gate driver 150 receives the start signal STE through the start signal line 154, and this shift register ESR may be closer to the COF 200 than the other shift registers of the plurality of shift registers ESR. Therefore, the light-emitting signal EM(1) correspondingly outputted by the shift register ESR of the first stage which receives the start signal STE and the corresponding light-emitting signal line EL thereof may be closest to the COF 200, and the light-emitting signal EM(N) correspondingly outputted by the shift register ESR of the last stage and the corresponding light-emitting signal line EL thereof may be farthest away from the COF 200, for example, but not limited herein. Alternatively, the light-emitting signal EM(N) correspondingly outputted by the shift register ESR of the last stage and the corresponding light-emitting signal line EL thereof may be, for example, closest to the flexible circuit board 300, but not limited herein. Through the above design, the scanning method of the panel 100 of the electronic device ED in this embodiment may perform scanning from the position closest to the COF 200 (e.g. the lower side) to the position closest to the flexible circuit board 300 (e.g. the upper side), and this scanning method performed from the bottom to the top may be referred to as a reverse scanning. By making the start end of the first gate driver 110 that outputs the scan signal SCAN(1) adjacent to the COF 200 which is used for transmitting the start signal STV, the path of signal transmission may be reduced, thereby improving the transmission efficiency or quality of the signals. In addition, by making the start end of the second gate driver 150 that outputs the light-emitting signal EM(1) adjacent to the COF 200 which is used for transmitting the start signal STE, the path of signal transmission may be reduced, thereby improving the transmission efficiency or quality of the signals.

Figure 6:
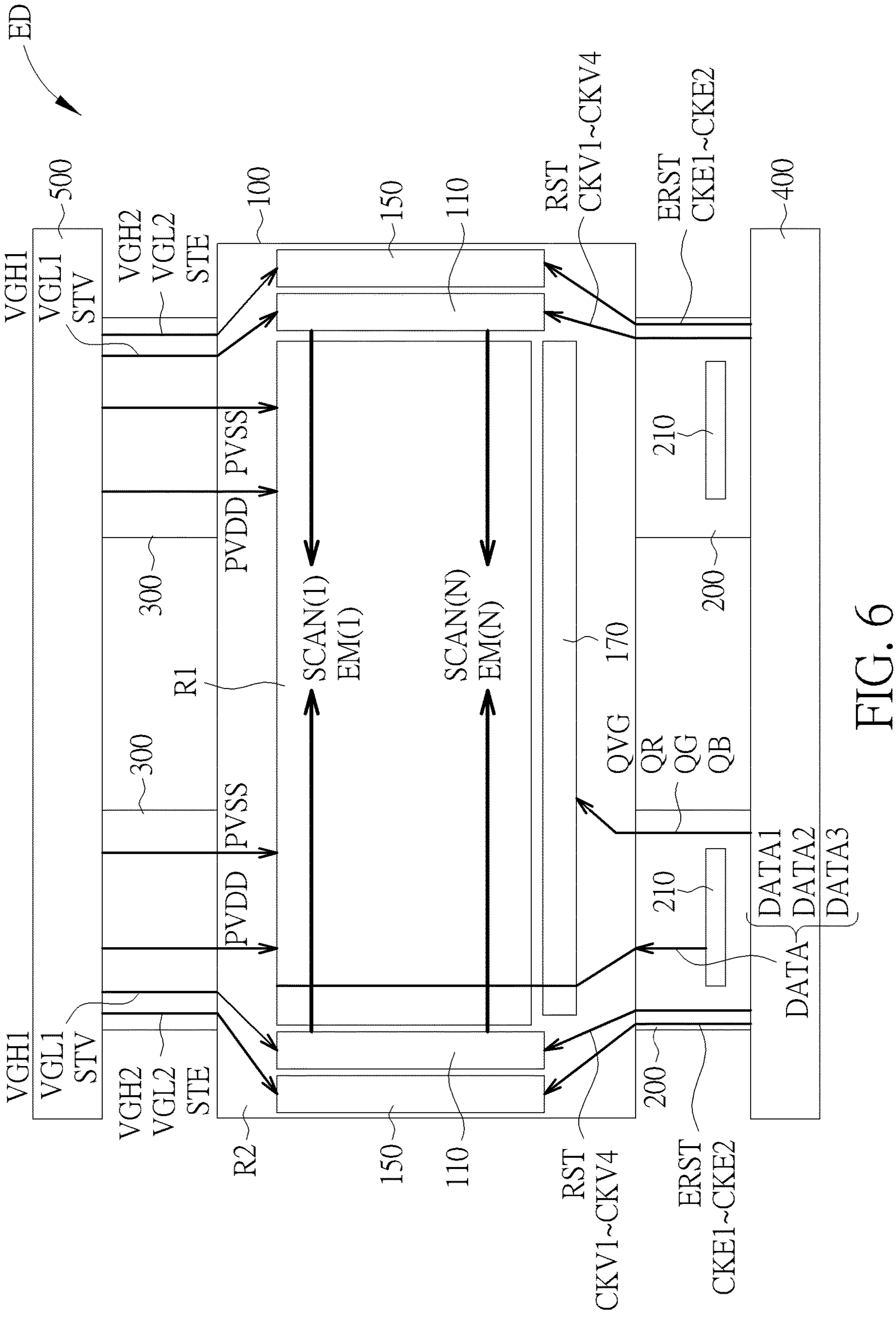
FIG. 6 is an architecture schematic diagram of an electronic device according to a third embodiment of the present disclosure.

Refer to FIG. 6, in conjunction with FIG. 3 and FIG. 4. FIG. 6 is an architecture schematic diagram of an electronic device according to a third embodiment of the present disclosure. In some embodiments, as shown in FIG. 6, FIG. 3 and FIG. 4, the flexible circuit board 300 may be used for transmitting the start signal STV to the first gate driver 110, one of the plurality of shift registers SR in the first gate driver 110 receives the start signal STV through the start signal line 114, and this shift register SR may be closer to the flexible circuit board 300 than the other shift registers of the plurality of shift registers SR, but not limited herein. Therefore, the scan signal SCAN(1) correspondingly outputted by the shift register SR of the first stage which receives the start signal STV and the corresponding scan line SL thereof may be closest to the flexible circuit board 300, and the scan signal SCAN(N) correspondingly outputted by the shift register SR of the last stage and the corresponding scan line SL thereof may be farthest away from the flexible circuit board 300, for example, but not limited herein. Alternatively, the scan signal SCAN(N) correspondingly outputted by the shift register SR of the last stage and the corresponding scan line SL thereof may be closest to the COF 200. In some embodiments, the flexible circuit board 300 may be used for transmitting the start signal STE to the second gate driver 150, one of the plurality of shift registers ESR in the second gate driver 150 receives the start signal STE through the start signal line 154, and this shift register ESR may be closer to the flexible circuit board 300 than the other shift registers of the plurality of shift registers ESR. Therefore, the light-emitting signal EM(1) correspondingly outputted by the shift register ESR of the first stage which receives the start signal STE and the corresponding light-emitting signal line EL thereof may be closest to the flexible circuit board 300, and the light-emitting signal EM(N) correspondingly outputted by the shift register ESR of the last stage and the corresponding light-emitting signal line EL thereof may be farthest away from the flexible circuit board 300, for example, but not limited herein. Alternatively, the light-emitting signal EM(N) correspondingly outputted by the shift register ESR of the last stage and the corresponding light-emitting signal line EL thereof may be closest to the COF 200, but not limited herein. Through the above design, the scanning method of the panel 100 of the electronic device ED in this embodiment may perform scanning from the position closest to the flexible circuit board 300 (e.g. the upper side) to the position closest to the COF 200 (e.g. the lower side), and this scanning method performed from the top to the bottom may be referred to as a forward scanning. By making the start end of the first gate driver 110 that outputs the scan signal SCAN(1) adjacent to the flexible circuit board 300 which is used for transmitting the start signal STV, the path of signal transmission may be reduced, thereby improving the transmission efficiency or quality of the signals. In addition, by making the start end of the second gate driver 150 that outputs the light-emitting signal EM(1) adjacent to the flexible circuit board 300 which is used for transmitting the start signal STE, the path of signal transmission may be reduced, thereby improving the transmission efficiency or quality of the signals.

In some embodiments, as shown in FIG. 5 or FIG. 6, the two first gate drivers 110 respectively located at two sides (e.g. the left side and the right side) of the panel 100 may drive the electrically connected scan lines at the same time, so as to provide the scan signal SCAN(1) to the scan signal SCAN(N) from the two sides to the central line by line, but not limited herein. In some embodiments, the two second gate drivers 150 located at two sides (e.g. the left side and the right side) of the panel 100 may be driven at the same time to provide the light-emitting signal EM(1) to the light-emitting signal EM(N) from the two sides to the central line by line, but not limited herein. Through the above design, the scanning method of the panel 100 of the electronic device ED may be configured as a head-to-head progressive scanning, but not limited herein.

Figure 7:
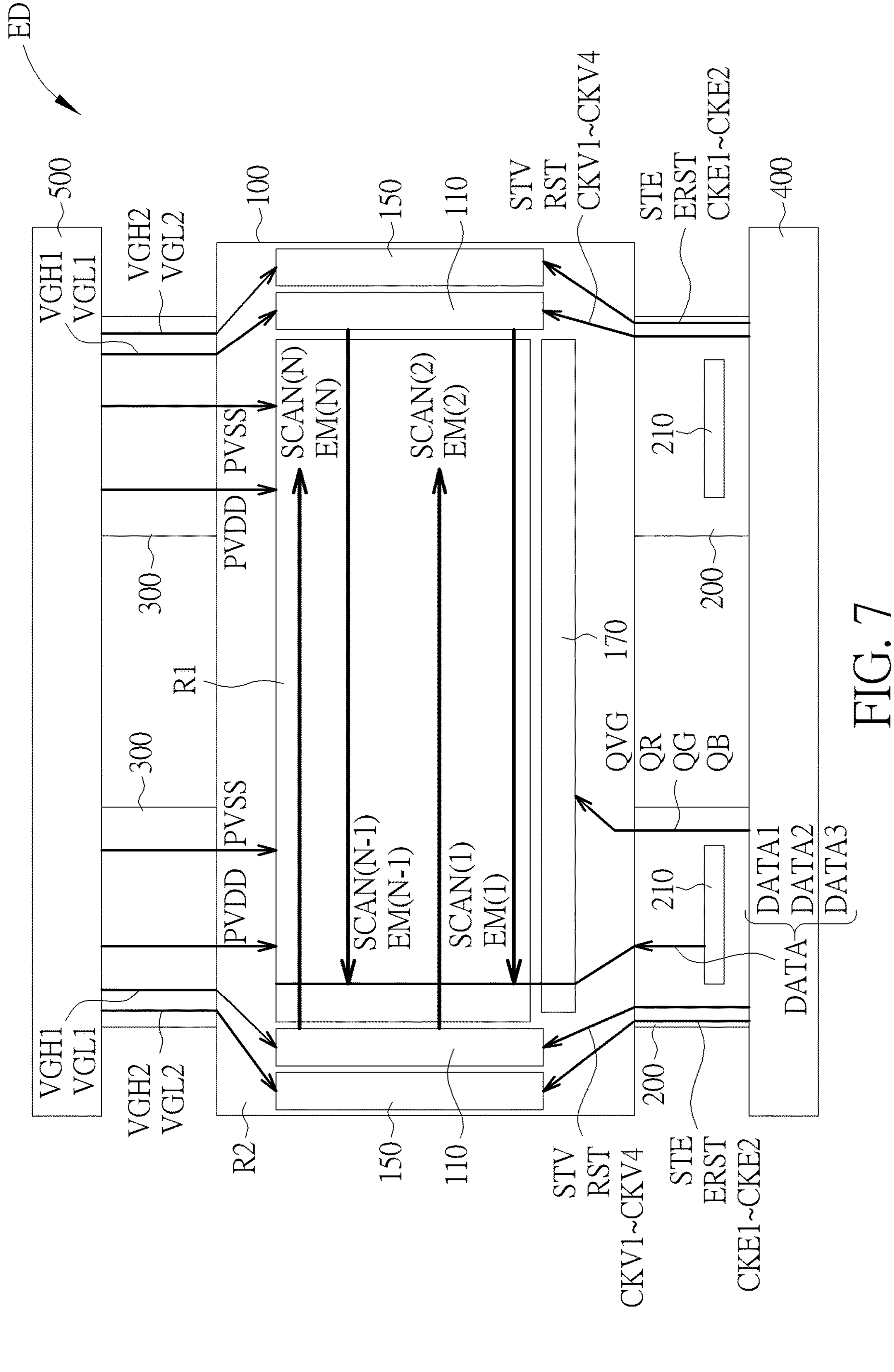
FIG. 7 is an architecture schematic diagram of an electronic device according to a fourth embodiment of the present disclosure.

Refer to FIG. 7, which is an architecture schematic diagram of an electronic device according to a fourth embodiment of the present disclosure. In some embodiments, as shown in FIG. 7, the two first gate drivers 110 located at two sides (e.g. the left side and the right side) of the panel 100 may be driven independently. For example, the first gate driver 110 located at the right side of the panel 100 may provide the scan signals of the odd rows such as the scan signal SCAN(1) to the scan signal SCAN(N−1) from the right to the left, and the first gate driver 110 located at the left side of the panel 100 may provide the scan signals of the even rows such as the scan signal SCAN(2) to the scan signal SCAN(N) from the left to the right, but not limited herein. In other embodiments (not shown), for example, the first gate driver 110 located at the right side of the panel 100 may provide the scan signals of the even rows such as the scan signal SCAN(2) to the scan signal SCAN(N) from the right to the left, and the first gate driver 110 located at the left side of the panel 100 may provide the scan signals of the odd rows such as the scan signal SCAN(1) to the scan signal SCAN(N−1) from the left to the right, but not limited herein. In some embodiments (not shown), the number of the scan lines connected to the first gate driver 110 at the right side of the panel 100 may be the same as or different from the number of the scan lines connected to the first gate driver 110 at the left side of the panel 100, but not limited herein.

In some embodiments, the two second gate drivers 150 located at different sides (e.g. the left side and the right side) of the panel 100 may be driven independently. For example, the second gate driver 150 located at the right side of the panel 100 may provide the light-emitting signals of the odd rows such as the light-emitting signal EM(1) to the light-emitting signal EM(N−1) from the right to the left, and the second gate driver 150 located at the left side of the panel 100 may provide the light-emitting signals of the even rows such as the light-emitting signal EM(2) to the light-emitting signal EM(N) from the left to the right, but not limited herein. In other embodiments (not shown), for example, the second gate driver 150 located at the right side of the panel 100 may provide the light-emitting signals of the even rows such as the light-emitting signal EM(2) to the light-emitting signal EM(N) from the right to the left, and the second gate driver 150 located at the left side of the panel 100 may provide the light-emitting signals of the odd rows such as the light-emitting signal EM(1) to the light-emitting signal EM(N−1) from the left to the right, but not limited herein. In some embodiments (not shown), the number of the light-emitting signal lines connected to the second gate driver 150 at the right side of the panel 100 may be the same as or different from the number of the light-emitting signal lines connected to the second gate driver 150 at the left side of the panel 100, but not limited herein.

Through the above design, the scanning method of the panel 100 of the electronic device ED may be configured as an interlaced scanning, but not limited herein. In addition, in the electronic device ED shown in FIG. 7, the COF 200 transmits the start signal STV to the first gate driver 110 and/or transmits the start signal STE to the second gate driver 150, and the scanning method of the panel 100 may perform scanning from the position closest to the COF 200 (e.g. the lower side) to the position closest to the flexible circuit board 300 (e.g. the upper side), i.e. the scanning method of the panel 100 is a reverse scanning, but not limited herein. In other embodiments, the flexible circuit board 300 may instead transmit the start signal STV to the first gate driver 110 and/or transmit the start signal STE to the second gate driver 150, and the scanning method of the panel 100 may perform scanning from the position closest to the flexible circuit board 300 (e.g. the upper side) to the position closest to the COF 200 (e.g. the lower side), i.e. the scanning method of the panel 100 may be a forward scanning, but not limited herein.

As detailed in the above description, according to the electronic devices of the embodiments of the present disclosure, the COF and/or the flexible circuit board respectively provide signals, and the COF and/or the flexible circuit board are respectively disposed at different sides of the panel, so that the flexibility of signal transmission and wiring configuration may be increased. In addition, through the arrangement and distribution of the elements in the electronic device in the space, the transmission efficiency or quality of the signals may be improved.

Those skilled in the art will readily observe that numerous modifications and alterations of the device and method may be made while retaining the teachings of the disclosure.

Accordingly, the above disclosure should be construed as limited only by the metes and bounds of the appended claims.

What is claimed is:

1. An electronic device, comprising:

a panel comprising a first gate driver, a switch transistor and a driving transistor, wherein an output terminal of the switch transistor is coupled to a control terminal of the driving transistor, and the first gate driver is used for receiving an alternating current (AC) signal and a direct current (DC) signal and outputting a control signal to a control terminal of the switch transistor according to the AC signal and the DC signal;

a Chip on Film electrically connected to the panel, wherein the Chip on Film is used for transmitting a data signal to an input terminal of the switch transistor and transmitting the AC signal to the first gate driver; and a flexible circuit board electrically connected to the panel, wherein the flexible circuit board is used for transmitting a power signal to an input terminal of the driving transistor and transmitting the DC signal to the first gate driver.

2. The electronic device according to claim 1, further comprising a first circuit board electrically connected to the Chip on Film, wherein the first circuit board is used for providing the AC signal and transmitting the AC signal to the first gate driver through the Chip on Film.

3. The electronic device according to claim 1, wherein the Chip on Film comprises a driving chip, and the driving chip is used for providing the data signal.

4. The electronic device according to claim 1, further comprising a second circuit board electrically connected to the flexible circuit board, wherein the second circuit board is used for providing the power signal and transmitting the power signal to the input terminal of the driving transistor through the flexible circuit board.

5. The electronic device according to claim 4, wherein the second circuit board is used for providing the DC signal and transmitting the DC signal to the first gate driver through the flexible circuit board.

6. The electronic device according to claim 1, wherein the AC signal comprises a start signal, and the first gate driver comprises a plurality of shift registers, wherein one of the plurality of shift registers receives the start signal, and the one of the plurality of shift registers is closer to the Chip on Film than the other shift registers of the plurality of shift registers.

7. The electronic device according to claim 1, wherein the flexible circuit board is used for transmitting another AC signal to the first gate driver, and the another AC signal is a start signal.

8. The electronic device according to claim 7, wherein the first gate driver comprises a plurality of shift registers, wherein one of the plurality of shift registers receives the another AC signal, and the one of the plurality of shift registers is closer to the flexible circuit board than the other shift registers of the plurality of shift registers.

9. The electronic device according to claim 1, wherein the Chip on Film and the flexible circuit board are respectively disposed on opposite two sides of the panel.

10. The electronic device according to claim 1, wherein the panel further comprises a light-emitting element, and an output terminal of the driving transistor is coupled to the light-emitting element, so that the light-emitting element receives the power signal transmitted from the flexible circuit board.

11. The electronic device according to claim 10, wherein the panel further comprises a second gate driver and a light-emitting transistor, the output terminal of the driving transistor is coupled to an input terminal of the light-emitting transistor, and an output terminal of the light-emitting transistor is coupled to the light-emitting element, wherein the second gate driver is used for receiving another AC signal and another DC signal and outputting another control signal to a control terminal of the light-emitting transistor according to the another AC signal and the another DC signal.

12. The electronic device according to claim 11, wherein the Chip on Film transmits the another AC signal to the second gate driver, and the flexible circuit board transmits the another DC signal to the second gate driver.

13. The electronic device according to claim 10, wherein the panel further comprises a test circuit coupled to the light-emitting element for controlling the light-emitting element to be turned on.

14. The electronic device according to claim 1, wherein the AC signal comprises one of a clock signal, a start signal and a reset signal.

15. The electronic device according to claim 1, wherein the DC signal comprises one of a gate high voltage and a gate low voltage.

16. The electronic device according to claim 1, wherein the panel further comprises a scan line, and the first gate driver transmits the control signal to the control terminal of the switch transistor through the scan line.

17. The electronic device according to claim 1, wherein the panel further comprises a data line, and the Chip on Film transmits the data signal to the input terminal of the switch transistor through the data line.

18. The electronic device according to claim 1, wherein the panel further comprises another first gate driver, and the another first gate driver and the first gate driver are located at two different sides of the panel and are driven at the same time.

19. The electronic device according to claim 1, wherein the panel further comprises another first gate driver, the another first gate driver and the first gate driver are located at two different sides of the panel and are driven independently.

20. The electronic device according to claim 1, wherein the panel has a working region and a peripheral region adjacent to the working region, the first gate driver is disposed in the peripheral region, and the switch transistor and the driving transistor are disposed in the working region.

* * * * *